United States Patent
Hubble, III et al.

(10) Patent No.: US 6,384,918 B1
(45) Date of Patent: May 7, 2002

(54) SPECTROPHOTOMETER FOR COLOR PRINTER COLOR CONTROL WITH DISPLACEMENT INSENSITIVE OPTICS

(75) Inventors: Fred F. Hubble, III; Joel A. Kubby, both of Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/535,007

(22) Filed: Mar. 23, 2000

Related U.S. Application Data (63) Continuation-in-part of application No. 09/448,774, filed on Nov. 24, 1999, now abandoned.

(51) Int. Cl.$^7$ .................................................. G01J 3/51
(52) U.S. Cl. ........................ 356/402; 356/419; 356/425; 250/226
(58) Field of Search ................................ 356/402, 405, 356/406, 407, 416, 419, 425; 250/226; 347/19

(56) References Cited

U.S. PATENT DOCUMENTS

| | | | |
|---|---|---|---|
| 3,910,701 A | 10/1975 | Henderson et al. | 356/39 |
| 4,553,033 A | 11/1985 | Hubble, III et al. | 250/353 |
| 4,568,191 A | * 2/1986 | Barry | 356/446 |
| 4,989,985 A | 2/1991 | Hubble, III et al. | 356/445 |
| 5,078,497 A | 1/1992 | Borton et al. | 356/446 |
| 5,137,364 A | 8/1992 | McCarthy | 356/402 |
| 5,272,518 A | 12/1993 | Vincent | 356/405 |
| 5,377,000 A | 12/1994 | Berends | 356/73 |
| 5,526,190 A | 6/1996 | Hubble, III et al. | 359/719 |
| 5,604,567 A | 2/1997 | Dundas et al. | 399/39 |
| 5,612,902 A | 3/1997 | Stokes | 364/526 |
| 5,671,059 A | 9/1997 | Vincent | 356/402 |
| 5,748,221 A | 5/1998 | Castelli et al. | 347/232 |
| 5,963,244 A | 10/1999 | Mestha et al. | 347/251 |
| 6,020,583 A | 2/2000 | Walowit et al. | 250/226 |
| 6,147,761 A | 11/2000 | Walowit et al. | 356/425 |
| 6,157,469 A | 12/2000 | Mestha | 358/504 |
| 6,178,007 B1 | 1/2001 | Harrington | 358/1.9 |

FOREIGN PATENT DOCUMENTS

EP  0 854 638 A2  7/1998

OTHER PUBLICATIONS

Website product literature, "DTP41 AutoScan Spectrophotometer," http://www.xrite.com/Products/Product.asp?Show=Description&id=21, and a sample color test print sheet with test color patches for the "X–Rite," Model DTP41 sensor.

\* cited by examiner

*Primary Examiner*—F. L. Evans (57) ABSTRACT

An improved spectrophotometer for non-contact measuring of the colors of colored target areas, especially, test patches on moving printed test sheets in an unrestrained normal output path of a color printer, which test patches may be sequentially angularly illuminated with multiple different colors, with a photosensor providing electrical signals in response, the spectrophotometer having a lens system for transmitting that reflected illumination from the test patch to the photosensor with a lens magnification ratio of approximately one to one. The exemplary spectrophotometer provides noncontact color measurements of moving color target areas variably displaced therefrom within normal paper path baffle spacings, with a displacement insensitivity of at least 6 millimeters about a nominal target to spectrophotometer separation.

26 Claims, 4 Drawing Sheets

SPECTROPHOTOMETER FOR COLOR PRINTER COLOR CONTROL WITH DISPLACEMENT INSENSITIVE OPTICS

This is a continuation-in-part of application Ser. No. 09/448,774, filed on Nov. 24, 1999 by the same inventors, now abandoned.

Cross-reference is made to application Ser. No. 09/448,987, filed Nov. 24, 1999, by Lingappa K. Mestha, and application Ser. No. 09/449,263, filed Nov. 24, 1999, by Lingappa K. Mestha.

The subject disclosure relates to an improved color measurement apparatus and system. In particular, to a spectrophotometer which is more accurate and much less sensitive to variations in spacing between the spectrophotometer and the surface of the substrate being color evaluated by the spectrophotometer, by displacement insensitive optics, so that direct contact between the spectrophotometer and the test surface is not required. Yet, as disclosed, this may be provided at little or no additional cost, in a compact and low cost spectrophotometer. This improvement allows or provides non-contact color measurement systems in which the surface can be tested while it is moving, and/or with only limited restraints on the position or movement of the test surface in the direction towards or away from the spectrophotometer; and/or provides more accurate color measurements from different areas of uneven test surfaces.

This enables such an improved spectrophotometer to be part of a color measurement system in which it may be mounted in a color printer, preferably in the paper path of the moving copy sheets, without having to otherwise modify the printer, or interfere with or interrupt normal printing, and yet accurately provide measurements of colors printed on the moving copy sheets as they pass the spectrophotometer. The disclosed improved spectrophotometer is thus especially suitable for an on-line color control and correction systems for color printers, for measuring the colors of moving image substrates, especially print sheets printed with selected color test patches. It enables a complete closed loop color control of a printer. However, the present invention is not limited thereto. Color measurements, and/or the use of color measurements for various quality or consistency control functions, are also important for many other different technologies and applications, such as in the production of textiles, wallpaper, plastics, paint, inks, etc. Studies have demonstrated that humans are particularly sensitive to spatial color variations. Typical full color printing controls, as well as typical color controls in other commercial industries, still typically utilize manual off-line color testing and frequent manual color adjustments by skilled operators. Both the cost and the difficulty of on-line use of prior color measurement apparatus and control systems has heretofore inhibited automation of many of such various commercial color testing and color adjustment systems. The disclosed system addresses both of those concerns.

As used in the patent claims and elsewhere herein unless otherwise specifically indicated, the term "spectrophotometer" may encompass a spectrophotometer, colorimeter, and densitometer, as broadly defined herein. That is, the word "spectrophotometer" is to be given the broadest possible definition and coverage in the claims herein, consistent with the rest of the claims themselves. The definitions or uses of terms vary or differ among various scientists and engineers. However, the following is an attempt to provide some simplified clarifications relating and distinguishing the respective terms "spectrophotometer", "calorimeter", and "densitometer", as they may be used in the specific context of specification examples of providing components for an on-line color printer color correction system, but not as limitations.

A typical "spectrophotometer" measures the reflectance of an illuminated object of interest over many light wavelengths. Typical prior spectrophotometers in this context use 16 or 32 channels measuring from 400 nm to 700 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.)

A "colorimeter" normally has three illumination channels, red, green and blue. That is, generally, a "colorimeter" provides its three (red, green and blue or "RGB") values as read by a light sensor or detector receiving reflected light from a color test surface sequentially illuminated with red, green and blue illuminators, such as three different color LED's or three lamps with three different color filters. It may thus be considered different from, or a limited special case of, a "spectrophotometer", in that it provides output color information in the trichometric quantity known as RGB.

Trichometric quantities may be used for representing color in three coordinate space through some type of transformation. Other RGB conversions to "device independent color space" (i.e., RGB converted to conventional L*a*b*) typically use a color conversion "lookup table" system in a known manner. (Examples are provided in patents cited below, and elsewhere.)

A "densitometer" typically has only a single channel, and simply measures the amplitude of light reflectivity over a range of wavelengths, which may be wide or narrow. The output of the densitometer detector is programmed to give the optical density of the sample. A densitometer is basically "color blind". For example, a cyan patch and magenta patch could have the same optical densities as seen by a densitometer, but, of course, are different colors.

A multiple LED's reflectance spectrophotometer, as in the example of the embodiment herein, may be considered to belong to a special case of spectrophotometers, which illuminate the target with narrow band or monochromatic light. (Others, with wide band illumination sources, can be flashed Xenon lamp spectrophotometers, or QH spectrophotometers.) It is a spectrophotometer programmed to give more detailed reflectance values by using more than 3 channel measurements (e.g., 10 or more channel measurements), with conversion algorithms. That is in contrast to normal 3 channel colorimeters, which cannot give true, human eye related, reflectance spectra measurements, because they have insufficient measurements for that (only 3 measurements).

It is well known to use conventional color filters of different colors for each of respectively different color LED's, as in the exemplary spectrophotometer embodiment herein. It is well known to use such color filters to exclude secondary emissions from LED's, and/or to further narrow the output spectra of LED illumination sources. Such color filters are believed to be used for that purpose in some "Accuracy Microsensors" LED based commercial products, for example. Thus, it will be further appreciated by those skilled in this art that such color filters are not needed for LEDs with sufficiently narrow bandwidths or for those which do not have secondary emissions that need to be suppressed. Therefor, color filters need not be employed in other embodiments of the subject spectrophotometer.

As noted, the type of spectrophotometer in the disclosed embodiment is a spectrophotometer especially suitable for being mounted in the printed sheets output path of a color printer to optically evaluate the imprinted output sheets as they move past the spectrophotometer. In particular, to measure a limited number of color test patch samples printed by the printer on actual printed sheet output of the printer during regular or selected printer operation intervals (between normal printing runs or print jobs). These color test sheet printing intervals may be at each machine "cycle-up", or as otherwise directed by the system software.

It is, however, as disclosed in the embodiment herein, also particularly advantageous to provide dual-mode color test sheets/banner sheets, in which multiple color patches of different colors are printed on otherwise blank areas of each, or selected, banner, cover, or other inter-document or print job separator sheets. Different sets of colors may be printed on different banner sheets. Providing this dual use of such sheets saves both print paper and printer utilization time, and also provides frequent color re-calibration opportunities, where the printing system is one in which banner sheets are being printed at frequent intervals anyway. It is quite common for shared user printers, even those with mailbox system job separators, to automatically generate and print a banner sheet immediately preceding the first page of each actual document being printed, with the banner sheet containing a limited amount of printed information about that print job and/or user. Some examples of banner sheets are disclosed in Xerox Corp. U.S. Pat. No. 5,547,178 and 5,316,279.

The preferred type of spectrophotometer of the disclosed embodiment is thus an important component for a practical on-line "real time" color printing color calibration or correction system which regularly measures the actual colors then being printed on printed sheets being outputted by the printer, as compared to the intended (or selected, or "true") colors of the electronic document images being inputted to the printer for printing. A low cost and relative simple spectrophotometer is highly desirable for such a "colorimetry" function for such an on-line color correction system, since a dedicated spectrophotometer must be provided for each printer.

A patent of particular interest as to using spectrophotometers for this function and application (at the printed sheets output of a color printer) is Xerox Corp. U.S. Pat. No. 5,748,221 issued May 5, 1998 to Vittorio Castelli, et al, filed Nov. 1, 1995 (D/95398). This U.S. Pat. No. 5,748,221, in Col. 7, lines 58–62, indicates that: "The operation of the detector 100 for colorimetry and registration measurement is based on imaging the diffused reflection of the illuminated target 52 on a detector at 1:1 magnification to take advantage of symmetry in minimizing image defects.

The preferred implementations of the systems and features disclosed herein may vary depending on the situation. Also, various of the disclosed features or components may be alternatively used for such functions as gray scale balancing with gray test patches, turning on more than one of the illumination sources at once, such as oppositely positioned LED's, etc.

However, in using dual mode color test banner sheets, or other color test sheets, in the specifically disclosed on-line printer system, it will be appreciated that the color test patches on the sheets should be compatible with the performance metrics of the spectrophotometer or other color sensor being used, and the color test patches are printed on the sheet in locations within the sensor's field of view as the sheet is fed past the sensor's field of view.

It will also be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender.

After the spectrophotometer or other color sensor reads the colors of the test patches, the measured colors may be processed inside the system controller or the printer controller to produce or modify the tone reproduction curve. The color test patches on the next banner page, and the customer document pages of the next print job may then be printed with that new tone reproduction curve. This process may be continuously repeated for each subsequent print job and its banner page so as to generate new or further corrected tone reproduction curves from each subsequent banner page. If the printer's color image printing components and materials are relatively stable, with only relatively long term drift, the tone reproduction curve produced by measuring colors off the normal single banner page for each print job, and using this closed loop control system, will be the correct curve for achieving consistent colors for at least one or even a substantial number of customer print jobs printed thereafter.

However, If there are substantial changes in the print media being used by the printer, or other sudden and major disturbances in the printed colors (which can be detected by the spectrophotometer output in response to the test patches on the next dual mode banner sheet or other color test sheet) then the subsequent customer print job may have incorrect color reproduction. In these situations of customer print media changes in the printer (or new print jobs or job tickets that specify a change in print media for that print job), where that print media change is such that it may substantially affect the accuracy of the printed colors for that subsequent print job, it is not desirable to continue printing and then have to discard the next subsequent print jobs printed with customer-unacceptable colors. In that situation it is preferable to interrupt the normal printing sequence once the sudden color printing disturbance is detected and to instead print plural additional color test sheets in immediate succession, with different color test patch colors, to sense and converge on a new tone reproduction curve that will achieve consistent color printing for that new print media, and only then to resume the normal printing sequence of customer print jobs. Thus, the subsequent customer print jobs would then use the final, re-stabilized, tone reproduction curve obtained after such a predetermined number of sequential plural color test sheets or dual mode banner pages have been printed.

However, this patent application is not related to or limited to any particular one of the various possible (see, e.g., various of the cited references) algorithms or mathematical techniques for processing the electronic signals from the spectrophotometer to generate color correction tables, tone reproduction curves or other color controls, and hence those need not be further discussed herein.

By way of background of some other patents relating to somewhat similar optics for densitometers or other optical sensing devices (but not necessarily related to the above specific application) there is noted U.S. Pat. No. 4,989,985—Densitometer for Measuring Specular Reflectivity; U.S. Pat. No. 4,553,033—Infrared Reflectance Densitometer; U.S. Pat. No. 5,526,190—Optical Element and Device for Providing Uniform Surface Irradiance; U.S. Pat. No. 5,078,497—Densitometer for Control of Liquid Ink Process. Commercial products are also available from Minolta, Accuracy Microsensors, Microparts, Ocean Optics, Gretag, X-Rite, and other commercial sources.

Further by way of background, various possible color correction systems can employ the output signals of spectrophotometers, using various sophisticated feedback, correction and calibration systems, which need not be discussed in any further detail here, since the general n concepts and many specific embodiments are disclosed in many other patents (including those cited hereinbelow) and publications. That is, to electronically analyze and utilize the spectrophotometer or other electronic printed color output information with a feedback analysis system for the color control systems for the printer. It is desirable in such systems to be able to use a reduced (smaller) number of color patch samples, printed at intervals during the regular printing operation of the printer, yet still provide relatively substantially continuous updating correction of the printer's color renditions over a wide or substantially complete color spectra. Noted especially is Xerox Corp. Attorney Docket No. D/96644 filed Jan. 21, 1997 by Steven J. Harrington as U.S. application Ser. No. 08/786,010, now issued as U.S. Pat. No. 6,178,007 on Jan. 23, 2001 published by the European Patent Office on Jul. 22, 1998 as EPO publication No. 0 854 638 A2; and Apple Computer, Inc. U.S. Pat. No. 5,612,902, issued Mar. 18, 1997 to Michael Stokes.

Another example of a test sheet with color test patches automatically generated by a color printer, for operator use, is shown in Xerox Corp. U.S. Pat. No. 5,604,567 issued Feb. 18, 1997 to Peter H. Dundas, et al.

Color correction and/or color control systems should not be confused with color registration systems or sensors. Those systems are for insuring that colors are correctly printed accurately superposed and/or accurately adjacent to one another, such as by providing positional information for shifting the position of respective color images being printed.

Other background patents which have been cited as to color control or correction systems for printers include Xerox Corp. U.S. Pat. No. 5,963,244 issued Oct. 5, 1999 to L. K. Mestha, et al entitled "Optimal Reconstruction of Tone Reproduction Curve" (using a lookup table and densitometer readings of photoreceptor sample color test patches to control various color printer parameters); and U.S. Pat. No. 5,581,376, issued December 1996 to Harrington; U.S. Pat. No. 5,528,386 issued Jun. 18, 1996 to Rolleston et al.; U.S. Pat. No. 4,275,413 issued Jun. 23, 1981 to Sakamoto et al.; U.S. Pat. No. 4,500,919 issued Feb. 19, 1985 to Schreiber; U.S. Pat. No. 5,416,613 issued May 16, 1995 to Rolleston et al.; U.S. Pat. No. 5,508,826 issued Apr. 16, 1996 to Lloyd et al.; U.S. Pat. No. 5,471,324 issued Nov. 28, 1995 to Rolleston; U.S. Pat. No. 5,491,568 issued Feb. 13, 1996 to Wan; U.S. Pat. No. 5,539,522 issued Jul. 23, 1996 to Yoshida; U.S. Pat. No. 5,483,360 issued Jan. 9, 1996 to Rolleston et al.; U.S. Pat. No. 5,594,557 issued January 1997 to Rolleston et al.; U.S. Pat. No. 2,790,844 issued April 1957 to Neugebauer; U.S. Pat. No. 4,500,919 issued February 1985 to Schreiber; U.S. Pat. No. 5,491,568 issued Feb. 13, 1996 to Wan; U.S. Pat. No. 5,481,380 to Bestmann issued Jan. 2, 1996; U.S. Pat. No. 5,664,072 issued Sep. 2, 1997 to Ueda et al.; and U.S. Pat. No. 5,544,258 issued Aug. 6, 1996 to Levien.

By way of further background on the subject of technology for automatic color correction for color printers or other reproduction apparatus, especially such systems utilizing feedback signals from a calorimeter or spectrophotometer (as noted, those terms may be used interchangeably herein), and/or automatically measuring the actually printed colors of test patches on printed copy sheets as they are being fed through the output path the printer, there is noted the following: the above-cited Xerox Corporation U.S. Pat. No. 5,748,221 filed Nov. 1, 1995 and issued May 5, 1998 to V. Castelli, et al, attorney docket no. D/95398, entitled "Apparatus for Colorimetry, Gloss and Registration Feedback in a Color Printing Machine", (noting especially the output path test print calorimeter detector details); the above-cited Apple Computer, Inc. U.S. Pat. No. 5,612,902, issued Mar. 18, 1997 to Michael Stokes; Xerox Corporation U.S. Pat. No. 5,510,896 issued Apr. 23, 1996 to Walter Wafler, filed Jun. 18, 1993 (see especially Col. 8 re color calibration from information from a scanned color test copy sheet as compared to original color image information); and Xerox Corporation U.S. Pat. No. 5,884,118 issued Mar. 16, 1999 to Mantell and L. K. Mestha, et al, entitled "Printer Having Print Output Linked to Scanner Input for Automated Image Quality Adjustment" (note especially Col. 6 lines 45–49).

U.S. Patents of interest to color correction in general, but which may be useful with, or provide background information for, the above or other systems, includes the above-cited Xerox Corporation U.S. Pat. No. 5,594,557, filed Oct. 3, 1994 and issued Jan. 14, 1997 to R. J. Rolleston et al., entitled "Color Printer Calibration Correcting for Local Printer Non-Linearities"; Seiko Epson Corp. U.S. Pat. No. 5,809,213, provisionally filed Feb. 23, 1996 and issued Sep. 15, 1998 to A. K. Bhattacharjya re reduced color measurement samples; and Splash Technology, Inc. U.S. Pat. No. 5,760,913 filed Feb. 12, 1996 and issued Jun. 2, 1998 to Richard A. Falk in which a calibration image is scanned using a scanner coupled to the printing system with a personal computer.

Also noted are pending Xerox Corp. U.S. applications Ser. No. 09/083,202 filed May 22, 1998 by Mark A. Scheuer, et al., entitled "Device Independent Color Controller and Method", attorney docket no. D/97695; U.S. Application Ser. No. 09/083,203, filed May 22, 1998 by Lingappa K. Mestha, entitled "Dynamic Device Independent Image", now issued as U.S. Pat. No. 6,157,469 on Dec. 5, 2000, attorney docket no. D/98203; U.S. application Ser. No. 09/232,465, filed Jan. 19, 1999 by Martin E. Banton, et al., entitled "Apparatus and Method for Using Feedback and Feedforward in the Generation of Presentation Images In A Distributed Digital Image Processing System", attorney docket no. D/98423; and U.S. application Ser. No. 09/221,996, filed Dec. 29, 1998 by Lingappa K. Mestha, et al., entitled "Color Adjustment Apparatus and Method", attorney docket no. D/98428.

As further well-known background for the reader on the subject of difficulties in color correction of printers in general, computers and other electronic equipment generating and inputting color images or documents typically generate three-dimensional or RGB (red, green, blue) color signals. Many printers, however, can receive four-dimensional or CMYK (cyan, magenta, yellow, and black) signals as input, and/or can print with four such print colors (although the printed images can be measured as corresponding RGB values). A look-up table is commonly provided to convert each digital RGB color signal value to a corresponding digital CMYK value before or after being received by the printer. Another difficulty is that a theoretical printer which had ideal toner, ink or dye printing materials colors and printing behavior would have a one-to-one correspondence of cyan-to-red, magenta-to-green, and yellow-to-blue. This would mean that when printed, the cyan ink would only absorb red light, the magenta ink would only absorb green light, and the yellow ink would only absorb blue light. However, real-world printers inherently have non-ideal printing materials colors and behaviors, and therefore have complex non-linear calorimetric responses. Also, interactions between the cyan, magenta, and yellow imaging materials exist, especially on the printed output, which result in unwanted or unintended absorptions and/or reflections of colors. Even after a printer is initially calibrated, such that one or a range of input digital CMYK values produce the proper color(s), the full spectrum of CMYK values and printed colors is not accurate. In other words, the colors asked or directed to be printed are not the same as the actual colors printed.

This discrepancy arises in part because the relationship between the digital input values that drive the printer and the resulting calorimetric response is a complex non-linear function. Labeling the response, or other values, as "colorimetric" can indicate that the response or value has been measured by such an instrument. Adequately modeling the calorimetric response of a printer to achieve linearity across the entire available spectrum requires many parameters. Typically, a color correction look-up table is built which approximates the mapping between RGB calorimetric space and CMYK values, as taught in various of the above-cited references. Each RGB coordinate may be typically represented by an 8-bit red value, an 8-bit green value, and an 8-bit blue value. Although those RGB coordinates are capable of addressing a look-up table having $256^3$ locations, measuring and storing $256^3$ values is expensive. The look-up table is thus typically partitioned into a smaller size such as 16×16×16 (4096) table locations, each of which stores a four-dimensional CMYK value. Other CMYK values may then be found by interpolating the known CMYK values using an interpolation process, for example, trilinear or tetrahedral interpolation.

The color correction look-up table may be built by sending a set of CMYK digital values to the printer, measuring the colorimetric RGB values of the resulting color patches outputted by the printer, and generating the look-up table from the difference between the inputted values and the measured outputted values. More specifically, the color correction look-up table corrects for nonlinearities, printing parameter variations, and unwanted absorptions of inks, so that the printer will print the true corresponding color.

After the color correction table is generated, the actual printer response may tend to drift over time. To correct for the drift, the system is adjusted or recalibrated periodically. Recalibrating the color correction table involves periodically printing and remeasuring a set of test color patches which are then compared to an original set of color patches by calibration software. Remeasuring, however, has heretofore more typically been performed by a scanner or other measuring device which is remote from the printer being recalibrated. In that case, an operator must manually reconfigure the scanner and calibration software to properly recognize and measure the test color patches. This assumes that the operator can properly identify the test color patches being tested in accordance with the original printer and its test pattern properties. Furthermore, once a color correction table is generated, it must be associated with the correct printer, otherwise, a different printer will be recalibrated with an incorrect correction table. The above-cited references on automatic, on-line, color correction note the important advantages of being able to provide direct output color measurements for each printer.

The present invention thus also provides for a new and improved method of calibrating a color printer which overcomes the above-referenced and other problems. However, it will be appreciated that although the specific embodiment is described with particular reference to desirable applications for calibrating and regularly re-calibrating color printers and/or refining color correction tables, that what is disclosed herein will also find various applications in other printing devices and other color testing and correction systems.

As discussed, in high quality color reprographic applications, it is highly advantageous to monitor system calorimetric performance on-line through the use of an integrated spectrophotometer. That is, to have the printing device automatically fairly frequently generate calibration prints on otherwise normally printed sheets with color patches based on digital test pattern generations, and to have an on-line spectrophotometer in the printer output accurately read those moving printed color test patches to provide printed output color measurement signals. This requires a spectrophotometer capable of effectively operating in that environment and under those conditions, which are not typical for conventional laboratory and other types of spectrophotometers.

Turning to details of this particular patent application's specific embodiment and its features and advantages, traditional spectrophotometers require, for uniform output, that the target be precisely positioned with respect to the spectrophotometer—typically, by being held stationary, in direct contact with said target. In contrast, disclosed herein is a design for a spectrophotometer that is (first order) insensitive to the positioning of the object or target of interest. This spacing insensitivity enables the spectrophotometer to be positioned at any convenient location in the paper path of a printing machine, rather than at a location where the paper position is tightly controlled. It may even be fitted into the output sheet stacker tray of various existing color printers, such as, for example, the Xerox Corp. "DC40" color printer.

A specific feature of the specific embodiment(s) disclosed herein is to provide in a color correction system for a color printer with an output path for printed color sheets, including printed test sheets with printed color test patches, in which a spectrophotometer is mounted in said printer output path for sensing the colors printed on a test patch on a test sheet as said test sheets are moving past said spectrophotometer in said printer output path, wherein said spectrophotometer includes a plurality of illumination sources for sequentially illuminating a said test patch with different illumination colors, a photodetector sensor providing electrical output signals, and a lens system for transmitting said illumination from said test patch to said photodetector sensor, whereby said photodetector sensor provides different said electrical output signals in response to viewing said different illumination colors from said sequential illuminations of said test patch by said plural illumination sources, the improvement in said spectrophotometer wherein said spectrophotometer is mounted at one side of said output path for providing non-contacting said viewing of said test patches with said spectrophotometer displaced from said test sheets, and wherein said lens system for transmitting said illumination from said test patch to said photodetector sensor provides substantial insensitivity to variations in said displacement between said spectrophotometer and said test sheets in said electrical output signals of said photodetector sensor.

Further specific features disclosed herein, individually or in combination, include those wherein said lens system has a lens magnification ratio of approximately one to one; and/or wherein said lens system has a lens magnification ratio of one to one; and/or wherein said photodetector sensor has a fixed area, and wherein said lens system overfills said fixed area with said transmitted illumination from said test patch; and/or wherein there are approximately ten or more of said plural illumination sources for sequentially illuminating a said test patch with different illumination colors; and/or wherein said plural illumination sources comprise multiple illumination sources for rapidly sequentially individually illuminating a single said test patch with respective different illumination colors, and wherein said multiple illumination sources are mounted arrayed around said photodetector sensor in said spectrophotometer, and wherein each said illumination source has a lens system for illuminating said same color test patch at substantially the same angle; and/or wherein said multiple illumination sources are provided by multiple LED's; and/or wherein said multiple illumination sources comprise 10 or more LED's; and/or wherein said multiple illumination sources are in a circular pattern surrounding said photodetector sensor and defining a central axis, and wherein said photodetector sensor and said lens system for transmitting said illumination from said test patch to said photodetector sensor are aligned with said central axis; and/or wherein said lens system for transmitting said illumination from said test patch to said photodetector sensor provides effective displacement insensitivity in said electrical signals provided by said photodetector sensor for variations in displacement between said test patch and said spectrophotometer of up to at least 6 millimeters about some nominal displacement so as to allow a corresponding amount of lateral displacement movement tolerance of said printed test sheets in said output path of said color printer; and/or an improved spectrophotometer for measuring the color of a color target area by illuminating the target area with a plurality of different colors and detecting the illumination reflected from said illuminated target area by said different colors, with a photodetector sensor providing electrical signals in response thereto, and with a lens system for transmitting said illumination reflected from said color target area to said photodetector sensor, the improvement wherein: said spectrophotometer provides non-contact measurement of said target area with displacement from said spectrophotometer, and said lens system provides substantial displacement insensitivity in said electrical signals provided by said photodetector sensor for variations in said displacement between said target area and said spectrophotometer of at least 6 millimeters about a nominal displacement; and/or wherein said lens system has a lens magnification ratio of approximately one to one; and/or wherein said lens system has a lens magnification ratio of one to one; and/or wherein said photodetector sensor has a fixed area, and wherein said lens system overfills said fixed area with said transmitted illumination reflected from said target area; and/or having more than three integral illumination sources with different illumination colors but commonly aimed at said target area for providing sequential illumination of said target area with said plurality of different colors; and/or having multiple illumination sources with different illumination colors but commonly aimed at said target area providing sequential illumination of said target area with said plurality of different colors, said multiple illumination sources being mounted around said photodetector sensor in said spectrophotometer, and wherein each said illumination source has a lens system for illuminating said target area at substantially the same angle; and/or wherein said multiple illumination sources are provided by multiple individual LED's,; and/or wherein said multiple illumination sources comprise approximately 10 or more individual LED's; and/or wherein said multiple illumination sources are in a circular pattern surrounding said photodetector sensor and defining a central axis, and wherein said photodetector sensor and said lens system for transmitting said illumination from said target area to said photodetector sensor are aligned with said central axis; and/or a spectrophotometer for measuring the color of a color target area displaced from said spectrophotometer, comprising: a defined area photosensor substantially spaced from said color target area, an array of multiple independent illumination sources of multiple different colors substantially spaced from said color target area for illuminating at least a common area of said color target area at substantially the same angle, an illumination control system for sequentially actuating individual said illumination sources for sequentially illuminating said at least common area of said color target area with said multiple different colors, and a lens system for transmitting said illumination from said at least common area of said color target area to said photosensor to overfill said defined area of said photosensor, said photosensor providing electrical signals in response to said illumination of said at least common area of said color target area with said multiple different colors, said lens system providing improved color measurement with said spectrophotometer displaced from said color target area by said lens system being adapted to provide reduced displacement insensitivity to variations in said displacement between said target area and said spectrophotometer; and/or wherein said lens system has a lens magnification ratio of approximately one to one; and/or wherein said lens system has a lens magnification ratio of one to one; and/or wherein said multiple illumination sources are provided by multiple individual LED's, each with a condensor lens; and/or wherein said multiple illumination sources comprise approximately 10 or more individual LED's; and/or wherein said multiple illumination sources are in a circular pattern surrounding said photosensor and said at least common area of said color target area, defining a central axis, and wherein said photosensor and said lens system are aligned on said central axis with said at least common area of said color target area, perpendicular thereto.

The disclosed system may be connected, operated and controlled by appropriate operation of conventional control systems. It is well known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

In the description herein the term "sheet" refers to a usually flimsy physical sheet of paper, plastic, or other suitable physical substrate for images, whether precut or web fed. A "copy sheet" may be abbreviated as a "copy", or called a "hardcopy" As will be noted, printed sheets may be referred to as "output". A "print job" is normally a set of related printed sheets, usually one or more collated copy sets copied from a one or more original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale, except for schematics) wherein:

Figure 4:
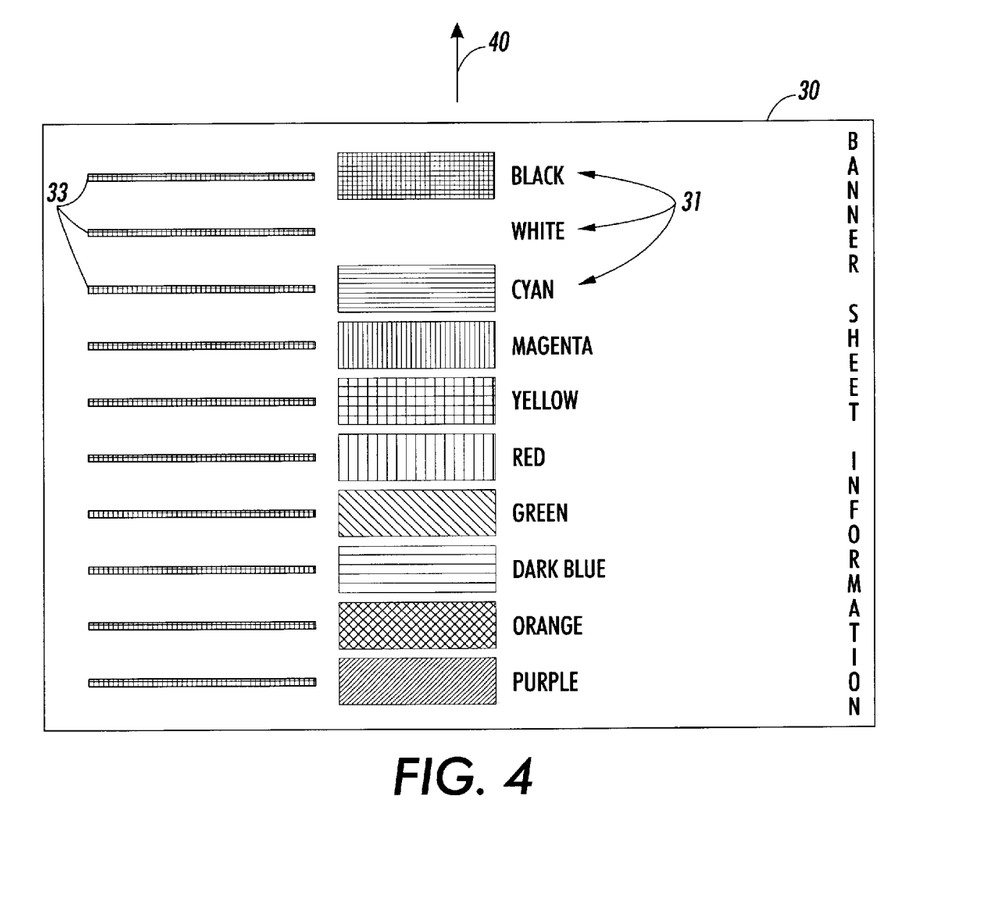
FIG. 4 shows one example of a test sheet which may be printed by a color printer with plural color test patches to be read by the spectrophotometer of FIGS. 1 and 2.

It will be appreciated that different colors are represented in the Figs., especially in FIG. 4, by their standard U.S. Patent Office black and white cross-hatching symbols.

Describing now in further detail the exemplary embodiments with reference to the FIGS., there is shown a color sensing system 10 with a spectrophotometer 12. The spectrophotometer 12 may be utilized with circuitry such as that of FIG. 3, or otherwise, to accurately multiply read plural different color test patches such as 31 printed on moving color test sheets 30 such as those shown in FIG. 4. The test sheets 30 may be conventionally printed on conventional copy sheet bond paper by a conventional color printer or printing system 20 (exemplified in FIG. 5). The disclosed spectrophotometer 12 can accurately read the colors of the test patches 31 even though the test sheets 30 are non-planar and/or variably spaced from the spectrophotometer 12 during their color measurements. Thus, the measurements are not affected by normal variations in sheet surface positions in a normal paper path of a printer. This allows the simple mounting of the spectrophotometer 12 at one side of the normal printed sheets output path 40 of the printer 20 (or various other color reproduction systems).

Figure 5:
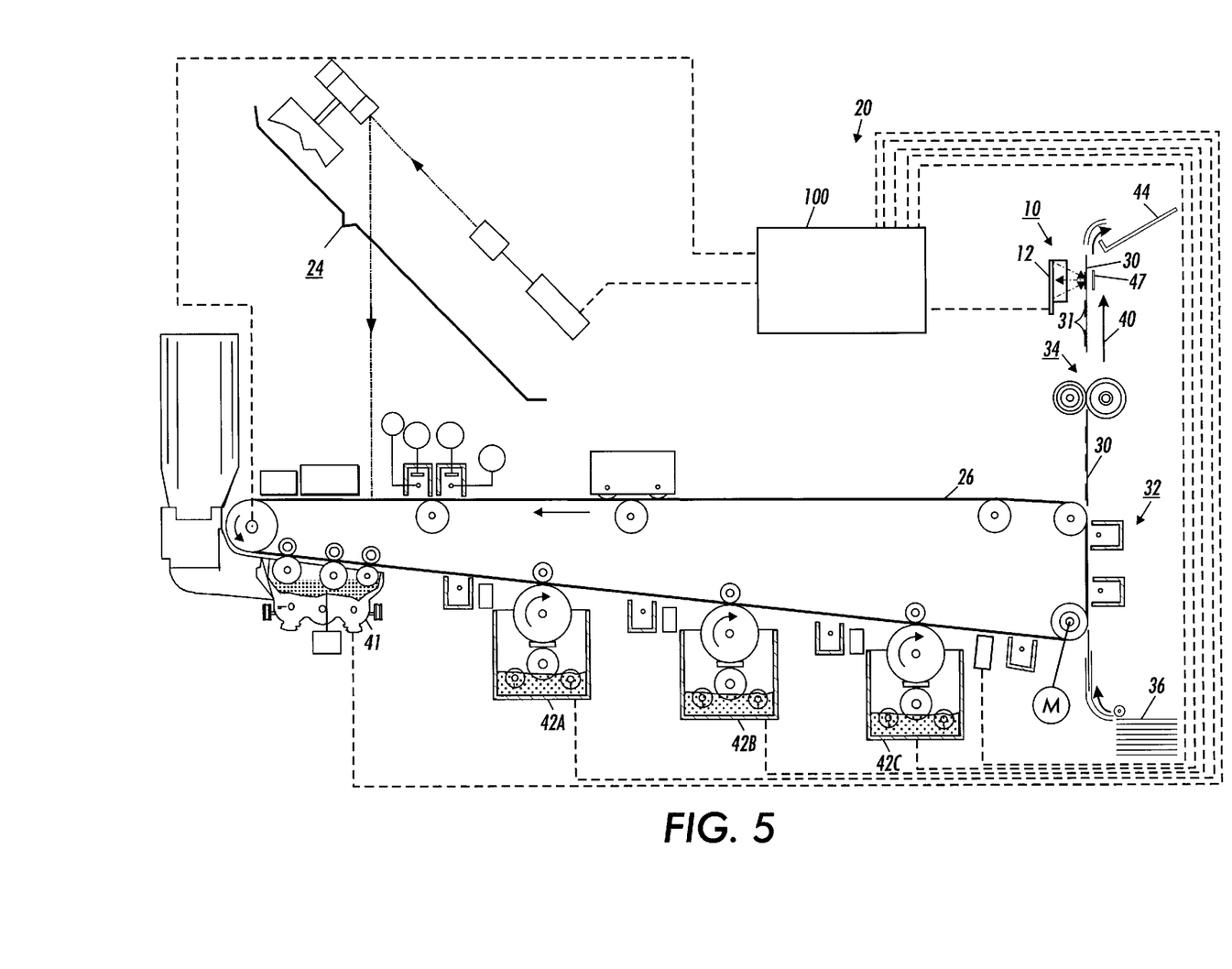
FIG. 5 schematically shows one example of an otherwise conventional color printer printing the test sheets of FIG. 4 and sequentially reading those test sheets while the test sheets are moving in their normal output path near the output of with the spectrophotometer of FIGS. 1 and 2, which is shown here mounted at one side of that sheet output path.

Describing first the exemplary color printer 20 of FIG. 5 here in more detail, it is schematically illustrating a conventional xerographic laser color printer, details of various of which will be well known to those skilled in that art and need not be re-described in detail herein. Examples of further descriptions are in the above-cited Xerox Corp. U.S. Pat. No. 5,748,221, etc., and other art cited therein. A photoreceptor belt 26 is driven by a motor M and laser latent imaged or exposed by a ROS polygon scanning system 24 after charging. The respective images are developed by a black toner image developer station 41 and/or one or more of three different color toner image developer stations 42A, 42B, 42C. The toner images are transferred at a transfer station 32 to sheets of copy paper fed from an input tray stack 36. Where one or more test sheets 30 are being printed instead of normal document images (at times, and with color tests, selected by the controller 100), each such test sheet 30 may be fed from the same or another sheet supply stack 36 and its test images transferred in the normal manner. The test sheet 30 is then outputted through fuser 34 to the same normal output path 40, as if it were any other normal sheet being normally color printed. As shown in FIG. 4, the test sheets 30 may be dual mode sheets also serving as banner sheets for print job separations, with typical printed banner sheet information, such as one or more of the user's name, the document title, the date and time, or the like.

However, here, the spectrophotometer 12 is mounted at one side of that output path 40 (or, in the output tray 44) to regularly sense the actual, fused, final colors being printed, providing the input for the on-line color sensing and correction system 10, with controller 100 and/or interactive circuitry and/or software. The controller 100, and sheet sensors along the machine 20 paper path, conventionally controls the feeding and tracking of sheet positions within the printer paper path. The controller 100 and/or a conventional sensor for fiduciary marks 33 or the like on each test sheet 30 can provide control or actuation signals to the spectrophotometer 12 circuitry for the spectrophotometer 12 to sequentially test or read the colors of each of the test patches 31 on the test sheet 30 as that test sheet 30 moves past the spectrophotometer 12 in the output path 40, as will be further described. The test patches 31 can be variously located and configured, as blocks, strips, or otherwise, of various digitally selected solid color images.

Thus, in the disclosed embodiment, plural test sheets 30 of paper or other image substrate material being printed by the color printer 20 can be automatically printed with pre-programmed plural test patches 31 of defined colors, preferably with associated simple fiduciary marks for signaling the reading location of each colored test patch on the test sheet. Each test sheet moves normally past the subject compact, fixed position, spectrophotometer 12 which is unobstructedly mounted at one side of the normal post-fuser machine output path 40 to both illuminate and view sheets passing thereby, in contrast to those prior systems requiring removing and holding a test sheet still, and moving a standard colorimeter or spectrophotometer over and in contact with the test sheet.

It will be seen that the spectrophotometer 12, although compact, has 10 different color sampling illumination sources, provided by 10 circularly mounted and sequentially operated LED's, D1 through D10, each with different color filters, such as 16 and 17, but each having the same simple condenser lens such as 18 and 19 for directing the respective LED's output uniformly onto the same target area, as especially shown in FIGS. 1 and 2, and further described below with reference to FIG. 3. The normal target area in the system 10 embodiment herein, of course, is a color test patch 31, however, it could also be an uninprinted portion of the paper. As particularly shown in FIG. 2, that illumination by any one of the LED's provides various levels of light reflected from that target (depending on the respective colors of both the test patch and the selected illumination source) a portion of which is collected by the single central lens 13, and focused by that lens 13 onto, and around (by overfill) a single photosensor D12. FIG. 2 illustrates with dashed line light rays both the LED illumination and the focusing by a projection lens 13 (a simple two-element lens in this example 13) of three exemplary target points A, B and C onto the focal plane of lens 13 as C', B' and A', of which B is in the center of the target, and has its image point in the center of the photosensor D12, while A and B are outside or inside the test patch 31 area and image points B' and A' outside the (small fixed) area of the photosensor D12.

Figure 1:
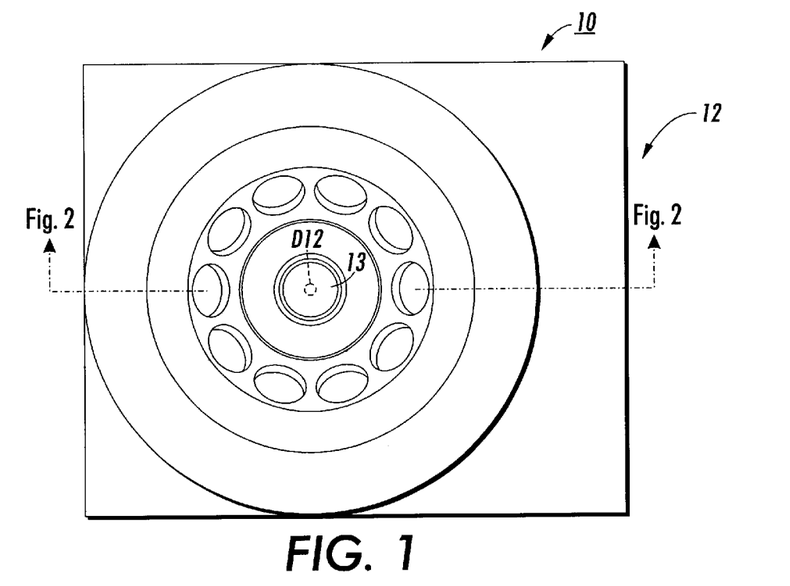
FIG. 1 is a top view of one example or embodiment of a reduced positional sensitivity spectrophotometer in accordance with the present invention.
Figure 2:
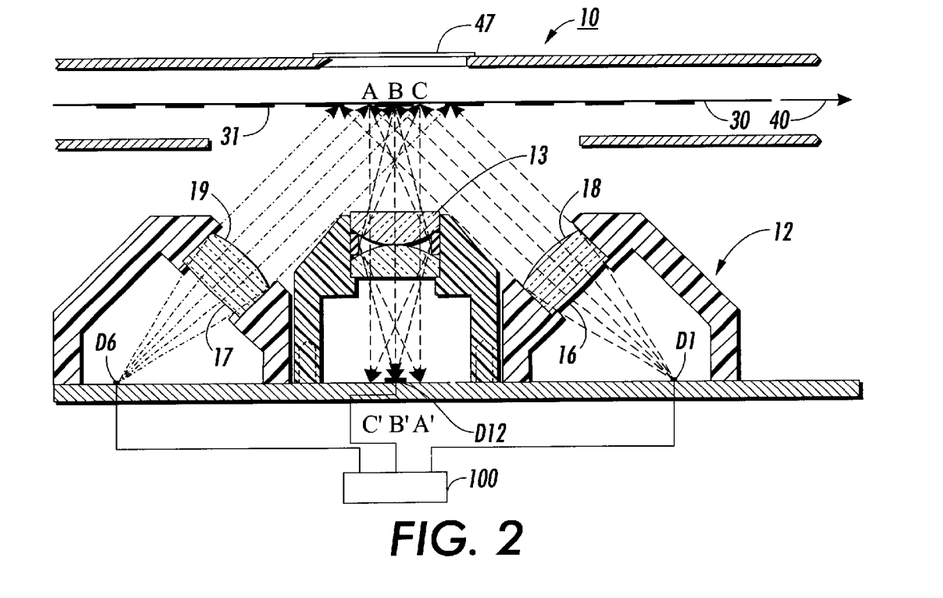
FIG. 2 is a cross-sectional view taken along the line 2—2 of the spectrophotometer of FIG. 1 shown measuring the color of a test patch of a test sheet moving in the printer output path.

Although conventional glass or plastic lenses are illustrated in FIGS. 1 and 2 here, it will be appreciated that fiber optics or selfoc lenses could be utilized in particular applications instead. Fiber optics may be used to conduct the illumination from the LED's. Also, a collecting fiber optic may be used if it is desired, for example, to space the detecting photosensor D12 remotely from the focal plane of the lens 13.

As utilized in this disclosed embodiment of an on-line color sensing system 10, this low cost multi-element spectrophotometer 12, as mounted in the printer 20 copy sheet output path 40, can thus be part of a color correction system to automatically control and drive to color printing accuracy the printer 20 CMYK color generation with a small number of printed test sheets 30. The color correction system can sequentially look at a relatively small series of color test patterns printed on copy sheets as they are outputted. One or more mathematical techniques for color error correction with multiple spectrophotometer-detected output color signals for each color patch as input signals can provide for a greatly reduced number of required printed test patches. For example, about 100–200 test patches, or only 4 to 8 test sheets of about 25 color patches per sheet, versus approximately 1000 test patches or 40 test sheets for a traditional machine color mapping, with a spectrophotometer 12 with approximately 10 different color sampling illumination sources. Also, as noted, and as shown in FIG. 4, the test sheets can desirably be the cover sheets ("banner" sheets) which printers automatically produce for separating print jobs already, with color test patterns additionally printed thereon, and/or test sheets printed upon "cycle up" of the printer (restarting of the printer). This further reduces or eliminates printer interruptions of normal color printing for color test sheet printing.

An accurate color control system, as disclosed herein, can thus provide regularly for testing and storing current machine color printing responses to color printing input signals (an up-to-date model) for remapping LAB (or XYZ) "device independent" color inputs (for later conversion to device dependent RGB or CMYK color space for printing). That information can also be profiled into a system or network server for each different machine (and/ or displayed on a CRT controller for color manipulation).

Turning now to the novel structure of the exemplary spectrophotometer 12 shown in FIGS. 1 and 2, there is disclosed a small, compact, simple, easily made, and low cost spectrophotometer optically designed to be first order insensitive to the separation between the sensing head and the object under interrogation, such as a color test patch 31. As noted, a particular benefit of this feature is the ability of this spectrophotometer 12 to dynamically measure images on paper in the transport path of a reprographic machine without stopping or unduly constraining the paper to a narrow nip or between closely confining baffles for that measurement, thereby allowing the use of the existing or conventional paper path, not requiring any additional modifications or UMC increment, and not creating the possibility of increased paper jams by a confined or restrictive portion of the paper path.

As noted in the introduction, a major challenge in color reprographics machines is the production of images that are identical in appearance to the "original", whether this original is an electronic image of a hard copy image scanned on the platen of a scanner or digital copier, or a stream of color encoded digital information from a PC or terminal, network, tape, magnetic disk, etc. With monochrome, i.e., black on white, copiers or printers it has been possible to perform adequate output print appearance-matching through control of the individual marking process elements with sensors and connecting feedback control systems internal of the machine. These have included electrostatic voltmeters, densitometers, and toner concentration sensors, among others, and particularly by the measurement of developed toner test patches on the photoreceptor. The human eye is relatively insensitive to variations in the image density of black on white images. However, with color images, the eye is far more sensitive to image fidelity, which manifests itself not just unidimensionally in lightness/darkness, but three dimensionally in hue, saturation, and lightness. In order to produce or correct the highest quality of reproduction of xerographic and other color images, it has become recognized that it may be necessary to position a spectrophotometer in the output paper path, post fusing, so as to measure the relative reflectance of developed and fused color test patches, so as to enable more complete corrections to be made to the color processing of the printer and/or to the color image data, in order to enable or maintain good color production of completed prints.

In order to be compatible with industry standards set forth by the CIE, ASTM, and others the test patch illumination for color measurement should be at 45 degrees to the surface of the media on which the color test patch is printed. Also for that standard, the color test patch measurement should be performed using flux diffusely scattered from the (so-illuminated) test patch at 90 degrees (perpendicular) to that color test patch surface. As may be seen, this is provided by the spectrophotometer 12.

A significant challenge to overcome in implementing an output spectrophotometer in a reprographic machine is the repeatable collection of the reflected flux, as the amount of flux collected is proportional to the solid angle subtended by the entrance pupil of the flux collection optics, which is the lens system 13 here.

As noted, prior spectrophotometers, colorimeters, and densitometers required that the measured target be held in a fixed predetermined position during measurement, typically accomplished by physically pressing the target material flat against a reference surface attached or held closely adjacent to the device's sense head.

In contrast, the position of print media in most existing printer paper paths, in the direction perpendicular to the paper path plane, is relatively uncontrolled in much of the paper path, since the paper normally is moved in between baffles which are much more widely spaced apart than the paper thickness, preferably by several millimeters, as illustrated here in FIG. 2. The paper may even be deliberately corrugated by corrugating feed rollers.

As the displacement between a sensor and the sensed media varies, the amount of flux collected will vary in a corresponding manner according to the following equation;

$E \Omega = A/r^2$

Where $\Omega$=the solid angle subtended by the projection optics
A=the area of the projection optics entrance pupil, and
r=the displacement between the test patch and the entrance optic.

As displacement changes, the amount of flux collected varies, and this variation will be indistinguishable at the electrical signal output from variations in the density of the patch, which will lead to errors in the measured density if not compensated for.

One solution would be to mechanically constrain the media in the measurement nip by means of additional apparatus in the paper path. However, as noted above, this is highly undesirable because of the increased cost associated with additional components, and the probable increase in jams due to the required constriction in the paper path.

The solution here is to instead provide a novel spectrophotometer 12 which is relatively insensitive to the relative displacement between the spectrophotometer and the color target media it is measuring. This is far more desirable, as it minimizes interference with the media, allows architectural versatility in the placement of the sensor, and, if done correctly, need add only a small increment in sensor UMC. There is provided here a spectrophotometer 12 whose output is relatively insensitive to the displacement from the surface of the media under interrogation, yet which is compact and relatively inexpensive and thus suitable for cost-effective deployment in the regular (and unrestricted) output paper paths of conventional reprographic machines.

As otherwise described herein, in the spectrophotometer 12 of FIG. 2 flux from a selected light source D1 (the one being illuminated at that time) is shown being collimated by a condensing lens 18 and applied to a test patch 31 on the print media 30. An inverted image of the illuminated area is formed at the detector D12 plane by a projection optic 13, which overfills the area of the detector D12. By selecting the magnification of that target optic 13 to be 1:1, it has been discovered that, to the first order and for object to sensor displacement variations that are small relative to the total conjugate, the energy density in the image detected by the detector will be invariant to the spacing between the media and the sense head, as will be explained. Light energy reflected from the test patch 31 which is collected by the optics 13 is proportional to the solid angle subtended by the projection lens 13. Mathematically, as the media to optic displacement, r (not shown), varies, the total energy in the image varies by the solid angle, which is proportional to $r^{(-2)}$. Variation in the media to sensor spacing also affects the image size in a corresponding manner. For 1:1 imaging optics, magnification varies as the inverse of the displacement, $r^{(-1)}$, which produces a change in the image area proportional to $r^{(-2)}$. Thus the image energy density, i.e. energy per unit area, becomes invariant with displacement. Since the detector samples a fixed area within the image, its output is thereby made invariant with spacing.

To express this another way, with a collection lens for the photosensitive detector D12 with a one to one magnification, a fixed exposed area of the photosensitive detector D12 will effectively get almost the same number of microwatts of energy per square millimeter from an illuminated target area even if the target area varies in distance therefrom by as much as plus or minus three millimeters. Or, in this example, a test sheet surface displacement or freedom of movement in the paper path of plus or minus three millimeters.

To provide a further explanation mathematically, assume:
At image and object conjugates of 2f, that the system magnification is 1:1

For small variations in media displacement, "d", image area $\sim (2f+d)^{-2}$

Target irradiance is maintained constant by the collimating action of the condensor lens.

Total energy in the image $\sim (2F+d)^{-2}$

Image energy density (image energy image area) is thus made independent of "d" for a magnification of 1:1.

A 1:1 magnification is thus the best operating point for the detector optics. While 1:1 is preferred, it is projected that a range of 0.9:1 to 1.1:1, or approximately 1:1, may be usable in some situations with degraded accuracy. By "approximately" 1:1 magnification of the lens 13 (the lens for the fixed area of the light receptive portion of the photosensor D12), it is meant here that first order accuracy in the light intensity on the photosensor, and thus first order accuracy in its output signal can also be obtained for a limited range above or below 1:1. That range would still allow a variation in target spacing from the spectrophotometer 12 of + or − approximately 2.5–3 mm within said first order color reflectance measurement accuracy, thus allowing approximately 6 mm or more of spacing, for normal spacing between the defining or confining opposing baffles of the paper path at that point.

Thus, this lens system for transmitting the illumination from the test patch to the photodetector sensor provides effective displacement insensitivity in the electrical signals provided by that photodetector sensor for variations in displacement between the test patch and the spectrophotometer of up to at least 6 millimeters. That allows a corresponding amount of lateral displacement freedom of movement tolerance (and opposing baffles spacing), and/or sheet curl or cockle tolerance, to be provided for all of the printed sheets, including the test sheets, in the output path of said color printer. That is, the test sheets do not have to be pressed against, or closely confined against, the spectrophotometer, and the printer output path does not have to be modified in that respect.

The presently preferred focal length of the lens system 13 at this point in time is about 32 mm. That appears to be a good tradeoff point between the amount of light energy desirably collected at the sensor and the achievement of displacement insensitivity in a reasonably sized spectrophotometer package. Different focal length lenses can be used, but the overall conjugate (the distance between the test patch and its image) would need to change correspondingly to maintain the same displacement insensitive behavior.

With such an exemplary subject displacement insensitive optics spectrophotometer, the detector output was observed to increase by only approximately 1% with media more distant and 1% with media closer to the sensor within said + or − approximately 2.5 mm range of displacement. This behavior was also modeled using Light Tools® software. As positioned to read test patches on paper in the paper path of a Xerox Corp. DC40 color printer, it successfully reduced delta E's from around +/−14 to below +/−2, and were comparable to measured L*a* b* values for test patches measured statically.

The concept is implimentable with various technologies or conventional components, including hybrid chip on-board, which is preferred, especially to provide a single on-board chip or board for a multiple LED spectrophotometer as shown. In that architecture, an appropriate selection of LED die with different wavelengths covering the visible spectrum may be formed in a circular pattern on a PWB. As will be further described with reference to FIG. 3, each LED may be lit in sequence. As shown in FIG. 2, the flux from each LED is collimated and centrally directed to be applied to the same test patch under the center of the spectrophotometer 12. That position is also on the center axis of the lens 13, which lens 13 is located in the center of the ring or circle of LED's, as clearly seen in FIG. 1. This enables a 1:1 image of the illuminated patch to be projected onto a single overfilled detector D12 on that same central axis. By recording the detector D12 outputs when a test patch is successively illuminated by each individual LED, the reflectance of the test patch as a function of different wavelengths can be determined, and with ten or more different LED output wavelengths as in this spectrophotometer 12 example, that reflectance of the test patch as a function of different wavelengths can be extrapolated or interpolated over the entire visible spectra.

Irrespective of the printer architecture, measurements need to be made in real time as the media passes across and through the spectrophotometer 12 sensing nip. It is anticipated that the preferred test patch size for the spectrophotometer 12 will be around 10 to 20 mm and that the measurement thereof may take about 2 to 5 milliseconds.

Figure 3:
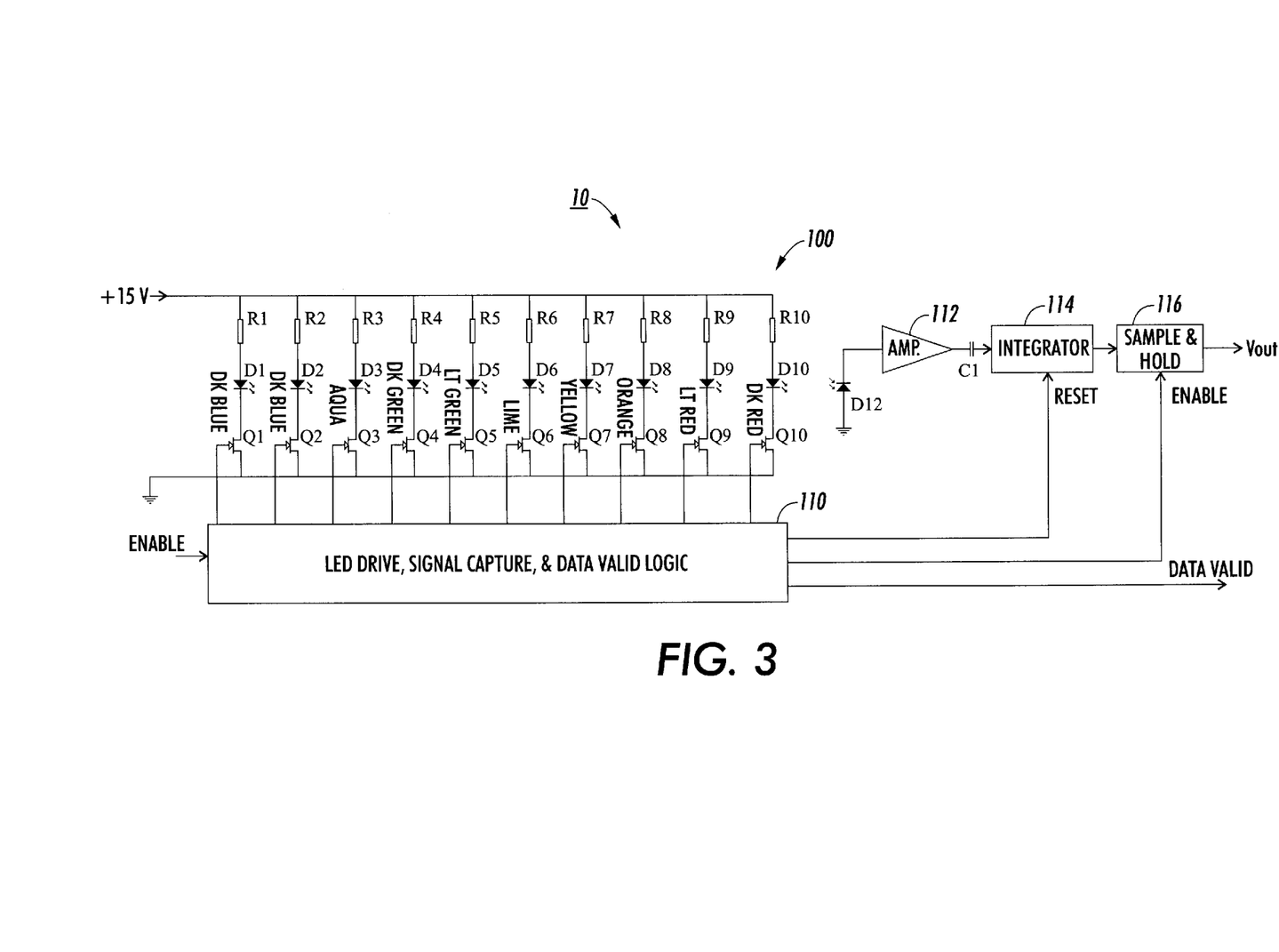
FIG. 3 schematically shows of one example of circuitry with which the exemplary spectrophotometer of FIGS. 1 and 2 may be operated.

FIG. 3 is a schematic or block diagram of exemplary LED driver and signal processing circuits of the LED spectrophotometer 12 of FIGS. 1 and 2, generally identified here for convenience as part of the controller 100, even though it can be, in whole or in part, a separate circuit, desirably having a single driver chip or die for all of the LED's in the spectrophotometer itself. In response to regular timing signals from the circuit 110 labeled "LED Drive, Signal Capture, & Data Valid Logic" here, each LED is pulsed in turn by briefly turning on its respective transistor driver Q1 through Q10, by which the respective LED's D1 through D10 are turned on by current from the indicated common voltage supply through respective resistors R1 through R10. Ten different exemplary filtered light output colors or wavelengths of the ten respective LED's D1 through D10 are indicated in this FIG. 3 by the legends next to each of those LED's. Thus, each LED is sequenced one at a time to sequentially transmit light though its respective condensor lens, such as shown in FIG. 2. Ten different reflectances from a sample color test patch from ten different LED's with ten different narrow wavelength bands provides 10 sampled points which can be converted to a much larger number of reflectance values at small nm increments using an optimized color lookup table.

While the LED's in this example are turned on one at time in sequence, it will be appreciated that the system is not limited thereto. There may be measurement modes in which it is desirable to turn on more than one LED or other illumination source at once on the same target area, such as opposing or oppositely angled illumination sources.

As also illustrated in the example of FIG. 3, at the right hand side, the relative reflectance of each actuated LED's color or wavelength is measured by conventional circuitry or software for amplifying 112 and integrating 114 the output of the photodiode detector D12, and directing this signal or information to a sample and hold stage 116. That stage 116 provides an output signal indicated here as Vout when released by an enabling signal input shown from circuit 110, which also provides an accompanying "Data Valid" signal. As discussed, the corresponding LED pulsing and detector sampling rate is sufficiently non-critical and rapid for sampling each of multiple reasonable size color test patches on a normal size copy sheet moving by the spectrophotometer even for a high speed printer moving sheets rapidly through its paper path. However, by briefly pulsing the common LED driver voltage source to provide brief LED drive currents above what is possible in a continuous mode, higher lux detection signals can obtained and the test patch can thus be interrogated in a shorter time period. In any case, by integrating the signal, such as with integrator 114 here, enhanced signal to noise ratios can be achieved.

It may be seen by those skilled in the art from that FIG. 3 shows a relatively simple and straightforward circuit. It can be readily implemented in an on-board hybrid chip architecture to provide a very compact and cost effective device.

An additional conventional LED light emitter and detector may be integrated or separately mounted to detect black and white fiduciary or control signals from the black and white fiduciary or timing marks 33 shown on the test sheet 30 of FIG. 4 to indicate the presence of each adjacent test patch 31 in the field of view of the spectrophotometer. However, it will be appreciated that with sufficiently accurate sheet timing and positional information already conventionally provided in the printer 20 controller 100 that such fiducial marks 33 may not be needed, and the time of passage of the respective test patches 31 past the imaging area of the spectrophotometer detector will be already available from the known timing position of the lead edge of each test sheet 30 within the paper path 40.

Individual calibration of each of the spectrophotometer's LED spectral energy outputs may be done by using a standard white tile test target for the spectrophotometer to convert each LED measurement to reflectance values, as is known per se.

However, where the spectrophotometer is mounted in the sheet path of a printer, as shown herein, this calibration can be done frequently, automatically, and without removing the spectrophotometer from the printer. That is, the ability of the spectrophotometer to be placed at one side of the paper path of the moving sheets in a printer enables a white calibration tile to be placed oppositely therefrom on the other side of the paper path, in the field of view of the photosensor and its lens system, so that during any selected, or all, of the inter-sheet gaps (the normal spacing between printed sheets in the sheet path of the printer) a re-calibration can be carried out without having to move or refocus the spectrophotometer. Specifically, when no sheet is present in the output path 40 in the sensing position or target area of the spectrophotometer 12, such as in the time interval between printing sheets, and/or before and after print cycles, the spectrophotometer 12 can alternatively see and be calibrated by an (optional) standard white tile test surface or calibration plaque 47 on the opposite side of the sheet output path 40. This may be a simple test target area 47 on (or even outside of) the opposite side of that paper path 40 as shown in FIGS. 2 and 5. (It does not even have to be in focus.) This standard white calibration target 47 may be taped, glued or painted on the existing paper path baffle there, so as to be "seen" by the spectrophotometer 12 in between output sheets or otherwise whenever that test target 47 is not covered by a sheet of paper present at that point of time in the paper path. The LED's may all be sequentially actuated to sequentially illuminate this target 47 and thus provide a photodetector D12 signal for each which can be electronically compared to previously stored white tile characteristics in the controller 100 or elsewhere to provide calibration data. Such white calibration tiles are well known and available commercially from Lab Sphere Co., BCRA, Hemmimdinger Color Labs, and others, etc. The calibration process itself is well known in the art, especially for initial calibrations. E.g., the X-Rite and Gretag Companies use this method for their grating based devices, and the ColorSavvy and Accuracy Microsensors companies use those techniques routinely, during final line calibration of their spectophotometers and calorimeters.

Initial spectrophotometer calibration data may be stored in an integral PROM IC shipped with the spectrophotometer. Alternatively, LED output calibration data may be programmed into the software being used to analyze the output of the spectrophotometer in other known manners, such as loading it into the disc storage or other programmable memory of the printer controller 100 or system print server.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a color correction system for a color printer with an output path for printed color sheets, including printed test sheets with multiple printed color test patches printed in a linear array in the movement direction of said printed test sheets by said color printer, in which a spectrophotometer is mounted in said printer output path for sensing the colors printed on a test patch on a test sheet as said test sheets are moving past said spectrophotometer in said printer output path, wherein said spectrophotometer includes a plurality of illumination sources with a sequential actuation circuit for sequentially illuminating a said test patch with different illumination colors, a photodetector sensor system with at least one photosensor providing electrical output signals, and a lens system for transmitting said illumination from said test patch to said photodetector sensor system, whereby said photodetector sensor system provides different said electrical output signals in response to viewing said different illumination colors from said sequential illuminations of said test patch by said plural illumination sources, wherein said spectrophotometer is mounted at one side of said printer output path for providing non-contacting said viewing of said test patches with said spectrophotometer spatially displaced from said test sheets, and wherein said lens system for transmitting said illumination from said test patch to said photodetector sensor system provides substantial insensitivity to variations in said displacement between said spectrophotometer and said test sheets in said electrical output signals of said photodetector sensor system.

2. The color correction system of claim 1, wherein said lens system has a lens magnification ratio of approximately one to one.

3. The color correction system of claim 1, wherein said lens system has a lens magnification ratio of one to one.

4. The color correction system of claim 1, wherein said photodetector sensor system at least one photosensor has a fixed photosensing area, and wherein said lens system overfills said fixed area with said transmitted illumination from said test patch.

5. The color correction system of claim 1, wherein there are approximately ten or more of said plural illumination sources for sequentially illuminating a said test patch with different illumination colors.

6. The color correction system of claim 1, wherein said plural illumination sources comprise multiple illumination sources for rapidly sequentially individually illuminating said test patch with respective different illumination colors, and wherein said multiple illumination sources are mounted arrayed around said photodetector sensor in said spectrophotometer, and wherein each said illumination source has a lens system for illuminating said same color test patch at substantially the same angle.

7. The color correction system of claim 1, wherein said plurality of illumination sources is provided by plural LED's and a condenser lens system.

8. The color correction system of claim 1, wherein said plurality of illumination sources comprise plural different spectral emission LED's.

9. The color correction system of claim 6, wherein said multiple illumination sources are in a circular pattern surrounding said photodetector sensor system and defining a central axis, and wherein said photodetector sensor system and said lens system for transmitting said illumination from said test patch to said photodetector sensor system are aligned with said central axis.

10. The color correction system of claim 1, wherein said lens system for transmitting said illumination from said test patch to said photodetector sensor system provides effective displacement insensitivity in said electrical signals provided by said photodetector sensor system for variations in displacement between said test patch and said spectrophotometer of up to at least 6 millimeters so as to allow a corresponding amount of lateral displacement movement tolerance of said printed test sheets in said output path of said color printer.

11. The color correction system of claim 1, wherein said multiple printed color test patches printed in a linear array in the movement direction of said printed test sheets by said color printer are spaced apart from one another in said movement direction and have separate but laterally associated and optically detectable printed spectrophotometer fiducial actuation marks.

12. An improved spectrophotometer for measuring the color of a color target area by illuminating the target area with a plurality of different colors and detecting the illumination reflected from said illuminated target area by said different colors, with a photodetector sensor system providing electrical signals in response thereto, and with a lens system for transmitting said illumination reflected from said color target area to said photodetector sensor system, the improvement wherein:
   said spectrophotometer provides non-contact measurement of said target area with displacement from said spectrophotometer, and
   said lens system provides substantial displacement insensitivity in said electrical signals provided by said photodetector sensor for variations in said displacement between said target area and said spectrophotometer of at least 6 millimeters by +/−3 mm about a nominal separation.

13. The spectrophotometer of claim 12, wherein said lens system has a lens magnification ratio of approximately one to one.

14. The spectrophotometer of claim 12, wherein said lens system has a lens magnification ratio of one to one.

15. The spectrophotometer of claim 12, wherein said photodetector sensor system has at least one photodetector with a fixed area, and wherein said lens system overfills said fixed area with said transmitted illumination reflected from said target area.

16. The spectrophotometer of claim 12, having more than three integral illumination sources with different illumination colors but commonly aimed at said target area for providing sequential illumination of said target area with said plurality of different colors.

17. The spectrophotometer of claim 12, having multiple illumination sources with different illumination colors but commonly aimed at said target area providing sequential illumination of said target area with said plurality of different colors, said multiple, illumination sources being mounted around said photodetector sensor in said spectrophotometer, and wherein each said illumination source has a lens system for illuminating said target area at substantially the same angle.

18. The spectrophotometer of claim 17, wherein said multiple illumination sources are provided by multiple individual LED's, each with a different color filter and an associated condensor lens.

19. The spectrophotometer of claim 17, wherein said multiple illumination sources comprise approximately 10 or more individual LED's.

20. The spectrophotometer of claim 17, wherein said multiple illumination sources are in a circular pattern surrounding said photodetector sensor and defining a central axis, and wherein said photodetector sensor and said lens system for transmitting said illumination from said target area to said photodetector sensor are aligned with said central axis.

21. A spectrophotometer for measuring the color of a color target area displaced from said spectrophotometer, comprising:
   a defined area photosensor substantially spaced from said color target area,
   an array of multiple independent illumination sources of multiple different colors substantially spaced from said color target area for illuminating at least a common area of said color target area at substantially the same angle,
   an illumination control system for sequentially actuating individual said illumination sources for sequentially illuminating said at least common area of said color target area with said multiple different colors,
   and a lens system for transmitting said illumination from said at least common area of said color target area to said photosensor to overfill said defined area of said photosensor,
   said photosensor providing electrical signals in response to said illumination of said at least common area of said color target area with said multiple different colors,
   said lens system providing improved color measurement with said spectrophotometer displaced from said color target area by said lens system being adapted to provide reduced displacement insensitivity to variations in said displacement between said target area and said spectrophotometer.

22. The spectrophotometer of claim 21, wherein said lens system has a lens magnification ratio of approximately one to one.

23. The spectrophotometer of claim 21, wherein said lens system has a lens magnification ratio of one to one.

24. The spectrophotometer of claim 21, wherein said multiple illumination sources are provided by multiple individual LED's, each with a condenser lens.

25. The spectrophotometer of claim 21, wherein said multiple illumination sources comprise approximately 10 or more individual LED's.

26. The spectrophotometer of claim 21, wherein said multiple illumination sources are in a circular pattern surrounding said photosensor and aid at least common area of said color target area, defining a central axis, and wherein said photosensor and said lens system are aligned on said central axis with said at least common area of said color target area, perpendicular thereto.

* * * * *